Sept. 22, 1942.   A. A. McCORMACK   2,296,724
METHOD OF MAKING REFRIGERATING APPARATUS
Filed June 30, 1939
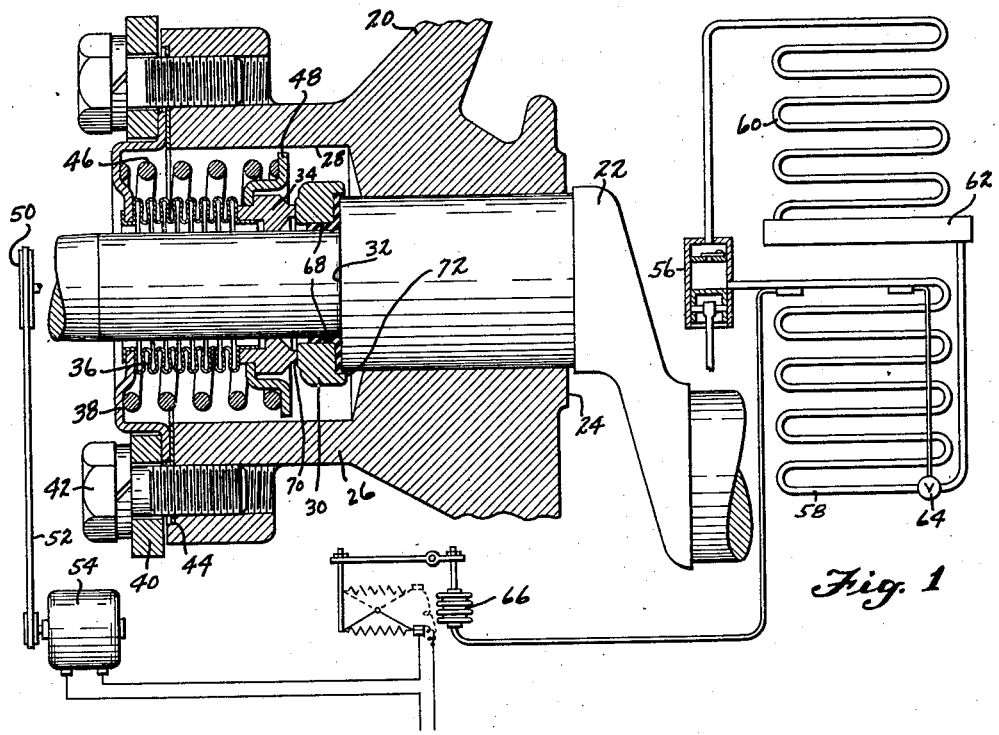
Fig. 1
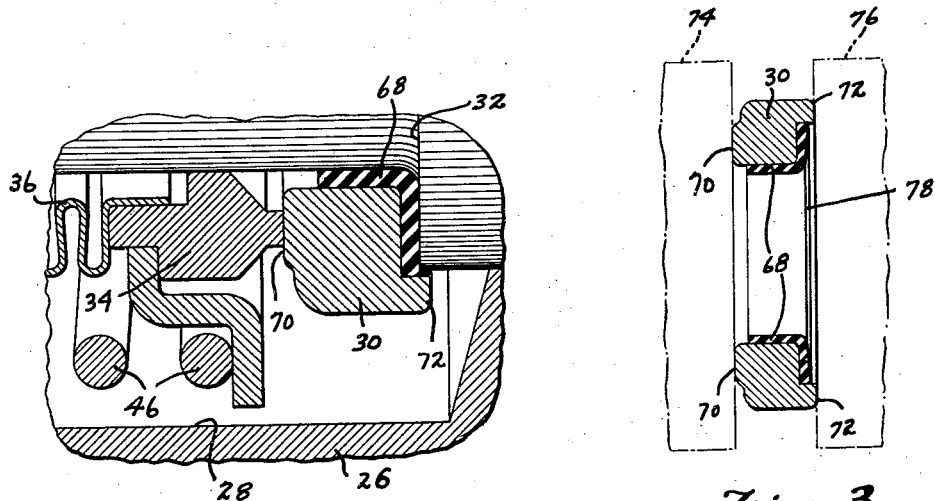
Fig. 2
Fig. 3
INVENTOR.
BY Alex A. McCormack
Spencer Hardman and John
ATTORNEYS Patented Sept. 22, 1942

2,296,724

UNITED STATES PATENT OFFICE 2,296,724

METHOD OF MAKING REFRIGERATING APPARATUS

Alex A. McCormack, Dayton, Ohio, assignor to General Motors Corporation, Dayton, Ohio, a corporation of Delaware Application June 30, 1939, Serial No. 282,225

1 Claim. (Cl. 29—156)

This invention relates to a method of making a refrigerating apparatus and more particularly to shaft seals for refrigerant compressors.

Formerly shaft seals operated directly against a shoulder on the compressor drive shaft. However, it is difficult to provide a hardened surface upon such a shoulder and more recently seal rings have been applied to the shaft by means of a loose gasket. Considerable difficulty was had with these loose gaskets, since the rubber-like material of these gaskets would creep and become distorted thereby breaking or disrupting the gas-tight seal between the seal ring and the shaft.

In order to overcome this it is an object of my invention to provide a seal ring construction in which a rubber-like gasket is vulcanized or otherwise permanently fastened to the seal ring, and it is a more particular object of my invention to provide a construction of the seal ring in which such a seal ring may be readily manufactured at a low cost.

It is an object of my invention to provide a hardened seal ring with a gasket permanently fastened thereto which is constructed so as to make it easy to grind and lap the sealing surface of the seal ring.

It is still another object of my invention to provide a protruding projection on the seal ring which makes it possible to readily grind and lap the seal face of the ring after the gasket of rubber-like material is in place.

It is still another object of my invention to provide a seal ring with a projection for facilitating lapping and grinding of the seal face.

It is still another object of my invention to provide an improved method of manufacturing such a seal ring.

Further objects and advantages of the present invention will be apparent from the following description, reference being had to the accompanying drawing, wherein a preferred form of the present invention is clearly shown.

In the drawing:

Fig. 1 is a sectional view of a compressor shaft seal embodying my invention, together with a diagrammatic illustration of a refrigerating system;

Fig. 2 is an enlarged fragmentary sectional view of a portion of the shaft seal included in the seal ring; and Fig. 3 is a view showing a method of grinding and lapping of a seal ring.

Briefly, I have shown a seal ring adapted to be lodged against the shoulder on the compressor drive shaft. The seal ring is provided with an annular gasket L-shaped in cross-section and formed of a rubber-like material which is vulcanized to one face and to the interior of the seal ring for making sealing contact with the shoulder and the reduced portion of the compressor shaft. The opposite face of the seal ring provides a running seal face which is ground and lapped while the other face of the seal ring is provided with a lapping projection or shoulder which overlies the shoulder on the compressor shaft and projects beyond the gasket of rubber-like material. The seal ring is held by this shoulder in a magnetic chuck for finish grinding the running seal face and the seal ring is lapped between two lapping blocks which contact the running seal face and this projection or shoulder which may be called a lapping shoulder.

Referring now to the drawing, there is shown in Fig. 1 a portion of the wall of a refrigerant compressor designated by the reference character 20 provided with a drive shaft 22 which extends through and is rotatably mounted within the bearing portion 24 of the compressor wall 20. The compressor wall 20 is provided with a seal boss 26 outside of the bearing portion 24 which is provided with a seal cavity 28. This seal cavity 28 contains the shaft seal which includes the seal ring 30 which is lodged against the shoulder 32 provided on the compressor shaft 22. The shaft seal also includes a movable seal ring 34 which is connected to one end of the metal bellows 36. The other end of this metal bellows 36 is connected to a pressed steel plate 38 which is fastened to the face of the boss 26 by the ring 40 and the cap screws 42. A gasket 44 is provided for sealing the metal plate 38 to the face of the boss 26. Coil spring 46 extends between the metal plate 38 and a spring retainer 48 provided upon the movable ring 34 for holding the face of the ring 34 in contact with the face of the ring 30.

This seal prevents the escape of refrigerant from the crankcase of the compressor through the drive shaft bearing. The drive shaft 22 of the compressor is provided with a pulley 50 at its outer end connected by a belt 52 to the compressor driving motor 54. The compressor is provided with a cylinder 56 containing a piston and a connecting rod which is connected to the drive shaft 42 of the compressor. When the drive shaft is rotated by the driving motor 54 refrigerant is withdrawn from the evaporating means 58 by the compressor and forwarded to a condenser 60 where the compressed refrigerant is liquefied and collected in a receiver 62 from which the liquid refrigerant is returned to the evaporator under control of a thermostatic automatic type of expansion valve 84. A snap acting switch 66 is ordinarily provided for controlling the operation of the driving motor 54.

Since the refrigerants used in the system are often toxic and since the escape of refrigerant decreases the efficiency of the system it is very important that leakage from the crankcase of the compressor be prevented by the shaft seal. Heretofore a loose gasket has been provided between the seal ring 30 and the shoulder on the drive shaft 22 of the compressor. Considerable difficulty was had with the loose gasket because of the fact that occasionally the seal ring 30 would stick to the movable seal ring 34 and the seal ring 30 would then move relative to the drive shaft 22 and cause the loose gasket to be damaged to such an extent that it would no longer provide a seal between the seal ring 30 and the shaft 22. Sometimes such a loose gasket would be completely pulled out of place; also there was always some tendency for the gasket to creep or to shift its position.

In order to overcome this difficulty I have provided a gasket 68 which is vulcanized to the seal ring. This annular gasket is preferably L-shaped in cross-section and provides a seal not only between the shoulder 32 on the shaft and the adjacent face of the seal ring 30 but also provides an effective gripping or driving portion which also acts as a second seal between the inside of the seal ring and the reduced portion of the compressor drive shaft 22. The face 78 of the seal gasket 68 is preferably slightly conical or inclined at an angle of about 4° so that it seals tightly against the outer portions of the shoulder 32.

Preferably this seal gasket 68 is made of a rubber-like material which includes a polymer of chloro-butadiene 1,3 known as chloroprene, Duprene or neoprene. However, for different applications different gasket materials may be used and if desired may be cemented or otherwise fastened in place.

New problems were encountered in the manufacture and finishing of such a seal ring. It was necessary to harden the seal ring before the gasket could be vulcanized in place and it was necessary to finish grinding and lap the seal face after the gasket was vulcanized in place because the heat from vulcanizing the gasket to the seal ring might distort the seal ring and warp the seal face. It was therefore necessary to find some means for providing a satisfactory finish for the operating seal face 70 after the gasket was vulcanized in place. One possible method would be to hold the seal ring 30 by its outer periphery. This method, however, did not appear to provide sufficient accuracy or ease of grinding or lapping.

In order to provide a surface which could be used to hold the seal ring while the face 70 was ground I provide a projecting shoulder 72 which surrounds the gasket 68 and projects beyond its surface so that this shoulder may be held in a magnetic chuck having a flat face upon which the face of the shoulder 72 is held by magnetic attraction. This is possible because the seal ring 30 is made of steel. This projecting shoulder 72 is first ground to reduce the ring to approximately the proper thickness desired and to provide a smooth surface to be held by the magnetic chuck. While the shoulder 72 of seal ring 30 is held by the magnetic chuck, the face 70 can readily be ground even though the gasket 68 is in place. By first grinding the shoulder 72 to the approximate desired thickness of the ring only a very small thickness of metal need be removed from the face 70 thereby assuring the retaining of the hardened surface layer upon this face 70.

Following this grinding of the face 70 the seal ring 30 is lapped between lapping blocks 74 and 76 as shown in Fig. 3. By this process the face 70 of the seal ring is lapped by the block 74 while the face of the shoulder 72 is lapped by the block 76. In this way the two faces of the seal ring are made perfectly plain and parallel.

In the steps prior to the vulcanization of the gasket 68 to the seal ring 30 the seal ring 30 is cut to an approximate size forming the seal face 70, the shoulder 72 and the recess for the gasket 68. After this the seal ring 30 is hardened and then the gasket 68 is vulcanized in place. Then following the vulcanization, the seal ring is placed in a magnetic chuck which is similar to the lapping block 76 but is also provided with magnetic means beneath its surface for holding the seal face 70 and the seal ring onto its surface similarly to that shown in Fig. 3. While in the magnetic chuck a grinding wheel is caused to grind the surface of the shoulder 72 of the seal ring until the thickness of the ring is reduced nearly to the desired final thickness, and then the ring is reversed and the shoulder 72 is held by the magnetic chuck and the grinding wheel is caused to grind the face 70 of the seal ring but only a small amount of metal is removed from this surface to bring it to its final thickness and to make its face 70 plane and smooth. Following this grinding operation the seal ring is placed between the lapping block as shown in Fig. 3 to provide a perfectly smooth, plane finished surface for the face 70 of the ring 30.

While the form of embodiment of the invention as herein disclosed, constitutes a preferred form, it is to be understood that other forms might be adopted, all coming within the scope of the claim which follows.

What is claimed is as follows:

The method of making a seal ring provided with a gasket which comprises forming a blank ring, rough cutting the seal face on one side of the ring and a gasket recess flanked by a projection on the other side, hardening the ring, hot vulcanizing a gasket in said gasket recess in said seal ring beneath said projection, grinding said seal face to provide a seal surface while said ring is held by a magnetic chuck through said projection, and lapping said seal face to provide a smooth seal surface.

ALEX A. McCORMACK.